(12) United States Patent
Morii et al.

(10) Patent No.: US 7,063,063 B2
(45) Date of Patent: Jun. 20, 2006

(54) FOUR-STROKE-CYCLE ENGINE PROVIDED WITH BELT DRIVEN-TYPE CONTINUOUSLY VARIABLE TRANSMISSION MECHANISM

(75) Inventors: Hideshi Morii, Hamamatsu (JP); Toshio Hayashi, Hamamatsu (JP); Hideki Shinmura, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 65 days.

(21) Appl. No.: 10/856,844

(22) Filed: Jun. 1, 2004

(65) Prior Publication Data
US 2005/0014583 A1 Jan. 20, 2005

(30) Foreign Application Priority Data
Jun. 3, 2003 (JP) ............................ P2003-158043

(51) Int. Cl.
*F16C 9/02* (2006.01)
(52) U.S. Cl. .............................. 123/198 R; 123/195 R
(58) Field of Classification Search ............ 123/198 R, 123/195 R, 195 A
See application file for complete search history.

(56) References Cited

U.S. PATENT DOCUMENTS

| 4,502,345 | A | * | 3/1985 | Butterfield | ................ 74/336 B |
| 5,216,989 | A | * | 6/1993 | Iwata et al. | .............. 123/90.31 |
| 5,301,645 | A | * | 4/1994 | Ball et al. | ................ 123/198 R |
| 5,678,516 | A | * | 10/1997 | Sakurai | .................. 123/198 R |
| 6,079,385 | A | * | 6/2000 | Wicke | ..................... 123/198 R |
| 6,609,491 | B1 | * | 8/2003 | Itoh et al. | ................ 123/195 A |
| 6,631,702 | B1 | * | 10/2003 | Tonnqvist et al. | ...... 123/198 R |
| 6,904,887 | B1 | * | 6/2005 | Higashide et al. | ...... 123/195 A |

* cited by examiner

*Primary Examiner*—Noah P. Kamen
*Assistant Examiner*—Jason Benton
(74) *Attorney, Agent, or Firm*—Oblon, Spivak, McClelland, Maier & Neustadt, P.C.

(57) ABSTRACT

A four-stroke-cycle engine of a vehicle such as snowmobile comprises a crank case, which is dividable into a plurality of crank case components having mating surfaces, through which the crank case is assembled, a crank shaft rotatably supported in the crank case at a portion between the mating surfaces of the crank case components, and a belt driven-type continuously variable transmission mechanism operatively connected to one end of the crank shaft through a clutch belt. The continuously variable transmission mechanism includes a drive shaft, and the clutch belt is stretched around the drive shaft and the crank shaft so that a tensioning direction of the clutch belt is shifted from a line passing the mating surfaces of the crank case components at a predetermined angle therebetween.

8 Claims, 8 Drawing Sheets

FOUR-STROKE-CYCLE ENGINE PROVIDED WITH BELT DRIVEN-TYPE CONTINUOUSLY VARIABLE TRANSMISSION MECHANISM

BACKGROUND OF THE INVENTION

1. Field of the Invention

The present invention relates to a four-stroke-cycle engine provided with a continuously variable transmission mechanism driven by means of belt and particularly applicable to a snowmobile.

2. Related Art

A four-stroke-cycle engine provided with a continuously variable transmission mechanism driven by means of belt (hereinafter referred to as a belt driven-type CVT mechanism or merely CVT mechanism) includes a crank shaft having one end projecting outward from the engine, and an input side of the CVT mechanism is connected to this projecting end of the crank shaft (hereinafter which may be referred to as a PTO (power take-off) shaft) such as shown in Japanese Patent Laid-Open (KOKAI) Publication No. HEI 3-208784 and Japanese Patent Laid-Open (KOKAI) Publication No. HEI 11-153035.

Because tension of a belt of the CVT mechanism is applied to the PTO shaft, it is preferable to set the PTO shaft to be shorter in length. Especially, in order to ensure sufficient strength, it is required to increase a distance between the PTO shaft and a bearing therefor for increasing the diameter of the crank shaft including the PTO shaft. In addition, it is also required to use a large-sized bearing, which leads to upsizing of the whole structure of the engine and increased weight thereof.

In addition, in order to decrease the length of the PTO shaft, it is preferable to take out a power for driving a cam chain or auxiliary equipment from the other component than the PTO shaft. In case where the engine is provided with a balancer to attenuate vibration of the engine, a power for driving the balancer is drawn normally from the crank shaft. Even in such a case, it is also preferable to take out the power from the other component than the PTO shaft.

The crank case is generally composed of a plurality of crank case components which are mated, in assembling the crank case, through respective mating surfaces so that a balancer shaft of the balancer is rotatably supported in the crank case between the mating surfaces of the crank case components, as like as for the crank shaft, thus improving assembling properties and providing advantageous effects in cost.

However, a magneto device is normally placed at one end of the crank shaft, which is opposite to the PTO shaft, thus making it difficult to provide, on such a side of the crank shaft, a power take-off unit for a cam chain or auxiliary equipment, or another power take-off unit for the balancer.

In the structure of the prior art Japanese Patent Publications mentioned above, tension (tensioning) direction applied to a belt member for the CVT mechanism accords or may accord with the direction of the mating surfaces of the crank case components. In such arrangement, when a metallic bearing is for example used and the tension direction of the belt of the CVT mechanism is consistent with the direction the mating surfaces of the crank case components, the a service life of the bearing may be deteriorated and shortened, thus providing unfavorable results.

SUMMARY OF THE INVENTION

An object of the present invention, which was conceived in consideration of the inconveniencies or drawbacks encountered in the prior art mentioned above, is therefore to provide a four-stroke-cycle engine of a vehicle, particularly of a snowmobile, which is provided with a belt driven-type continuously variable transmission mechanism, capable of permitting to decrease the length of the crank shaft without increasing the diameter thereof and improving durability of a bearing therefor.

This and other objects of the present invention can be achieved according to the present invention by providing a four-stroke-cycle engine which comprises:

a crank case, which is dividable into a plurality of crank case components having mating surfaces, the crank case components being assembled into the crank case by contacting the mating surfaces to each other;

a crank shaft rotatably supported in the crank case at a portion between the mating surfaces of the crank case components; and a belt driven-type continuously variable transmission mechanism operatively connected to one end of the crank shaft through a clutch belt, the continuously variable transmission mechanism including a drive shaft, the clutch belt being stretched around the drive shaft and the crank shaft so that a tension direction of the clutch belt has an inclination by a predetermined angle with respect to a line passing the mating surfaces of the crank case components.

In a preferred embodiment of this aspect, it may be desired that the mating surfaces of the crank case components are perpendicular to an axial line of a cylinder of the engine so that the engine is disposed in an inclined state in which the axial line of the cylinder inclines relative to a perpendicular line.

The engine may further include a balancer shaft rotatably supported in the crank case so as to be held between the mating surfaces of the crank case components.

The engine may further comprises: auxiliary equipments including a magneto device, a cam drive sprocket for driving a cam shaft, a pump drive gear for driving an oil pump and a clutch driven gear for a starter clutch to which a driving force of a starter motor is transmitted; and drive units for driving the auxiliary equipments, in which the auxiliary equipments and the drive units are arranged on a side opposite to the side on which the belt driven-type continuously variable transmission mechanism is disposed. The balancer shaft may be driven by a balancer drive gear disposed on an inner side of a bearing portion by which one end of the crank shaft located on the side of the belt driven-type continuously variable transmission mechanism is supported. The drive units for the auxiliary equipments are placed on an outer side of another bearing portion by which another end of the crank shaft located on the side opposite to the side on which the belt driven-type continuously variable transmission mechanism is supported.

The engine may preferably be a four-stroke-cycle water-cooling engine for a snowmobile provided with an engine room in which the engine is transversely mounted. The crank case may be composed of upper and lower crank case halves which are joined together at the mating surfaces thereof.

It may be also desired that the predetermined angle of the tension direction of the clutch belt with respect to the mating surfaces of the crank case components is within a range of 30 to 60 degrees.

According to the four-stroke-cycle engine of the present invention of the structures and characters mentioned above, the engine is equipped with the belt driven-type continuously variable transmission mechanism which is driven by the clutch belt stretched around the drive shaft of the transmission mechanism and the crank shaft with a tensioning direction offset from the line extending from the mating surfaces of the crank case components. It is therefore possible to improve durability of the bearing and the bearing receiving portions, by which the crank shaft is rotatably supported, thus increasing the service life of the bearing. Furthermore, according to the technology of the present invention, the engine could be easily assembled.

In addition, it is possible to decrease the diameter and length of the crank shaft, thus providing the engine in a small-size and a reduced weight, as well as maintaining a properly balanced load for the engine.

The nature and further characteristic features of the present invention will be made more clear from the following descriptions made with reference to the accompanying drawings.

DESCRIPTION OF THE PREFERRED EMBODIMENTS

A preferred embodiment of the present invention will be described in detail hereunder with reference to the accompanying drawings.

Figure 1:
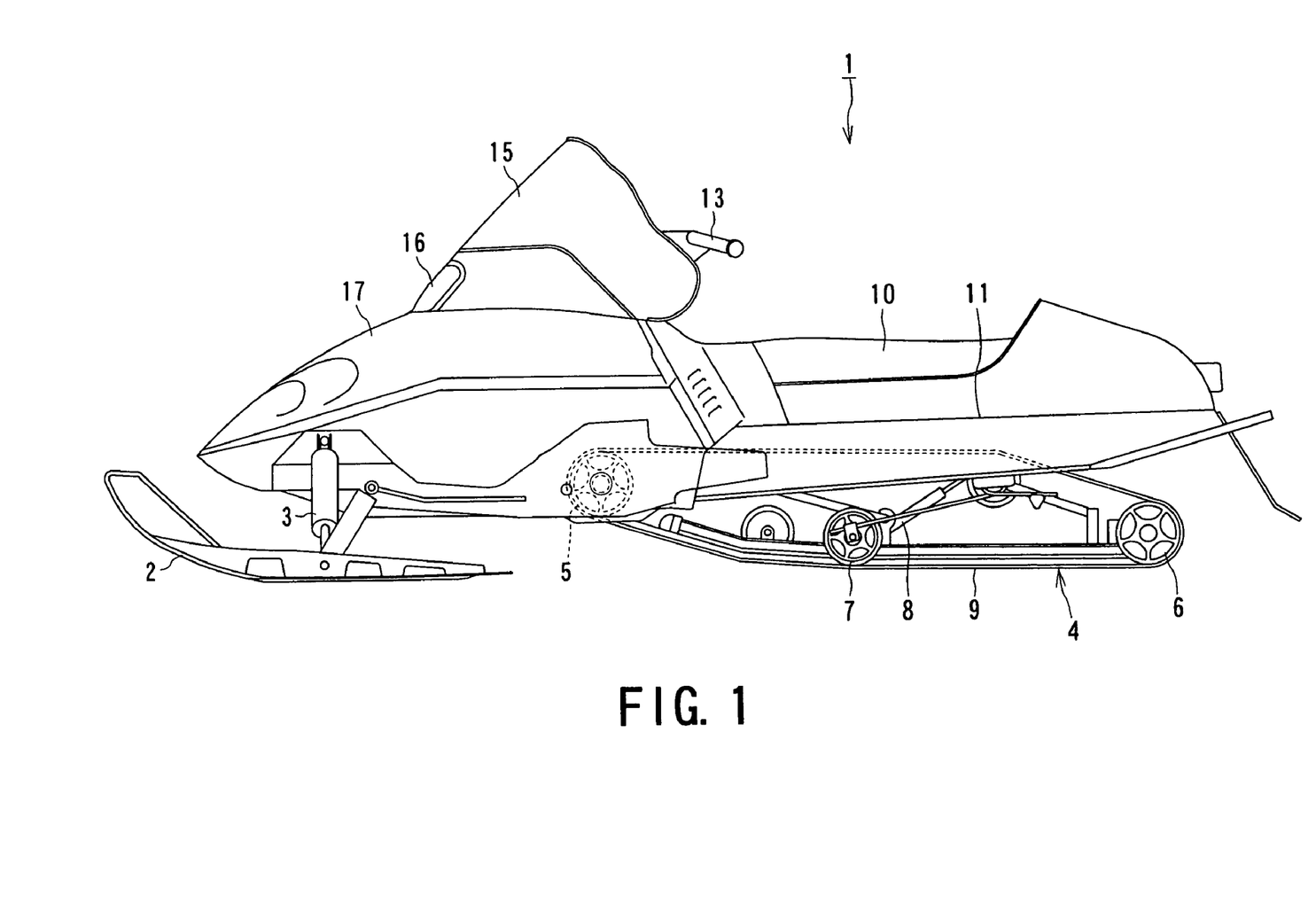
FIG. 1 is a left-hand side view of a snowmobile on which there is mounted a four-stroke-cycle engine, according to one embodiment of the present invention, which is provided with a belt driven-type continuously variable transmission mechanism.
Figure 2:
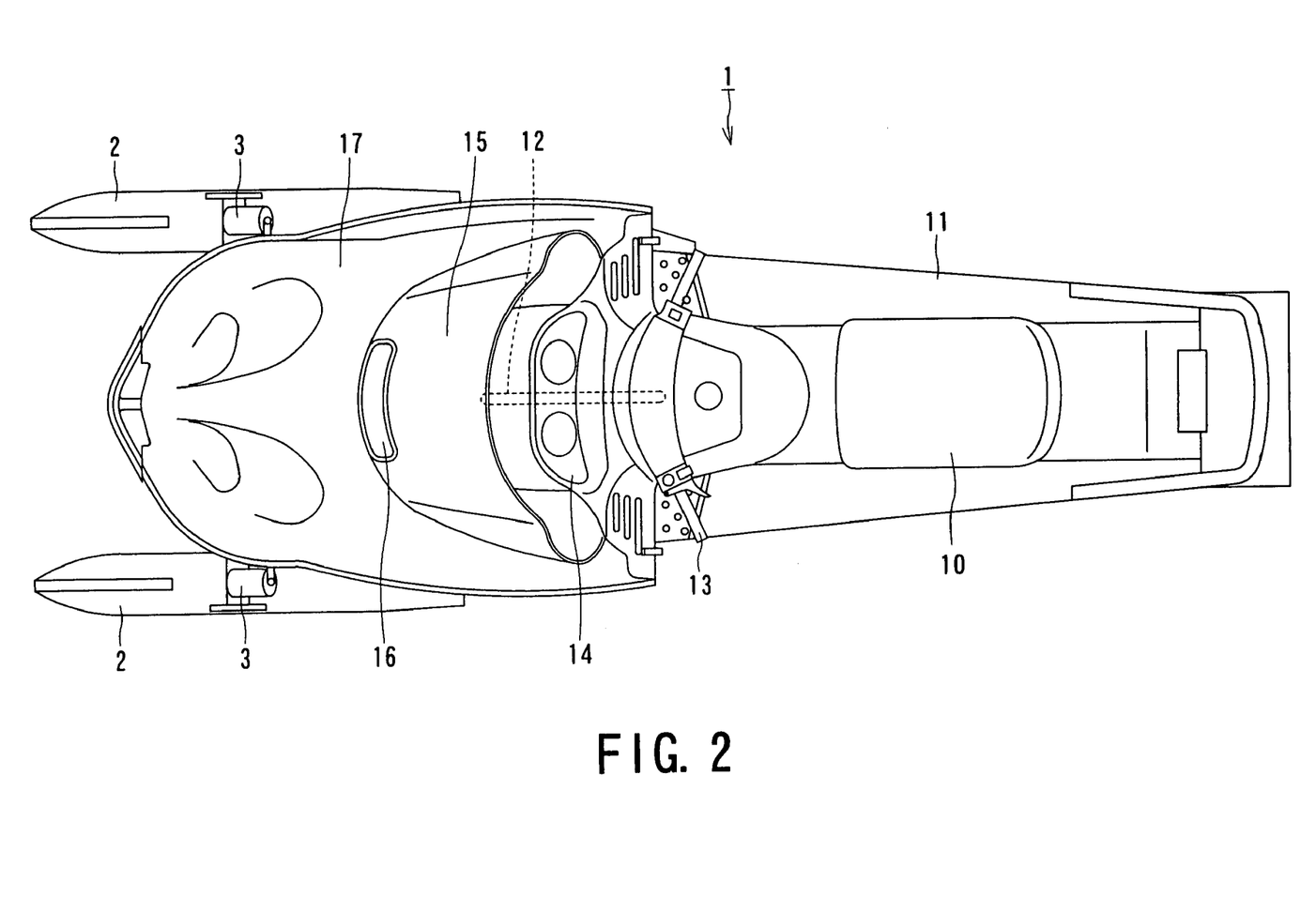
FIG. 2 is a plan view of the snowmobile shown in FIG. 1.
Figure 3:
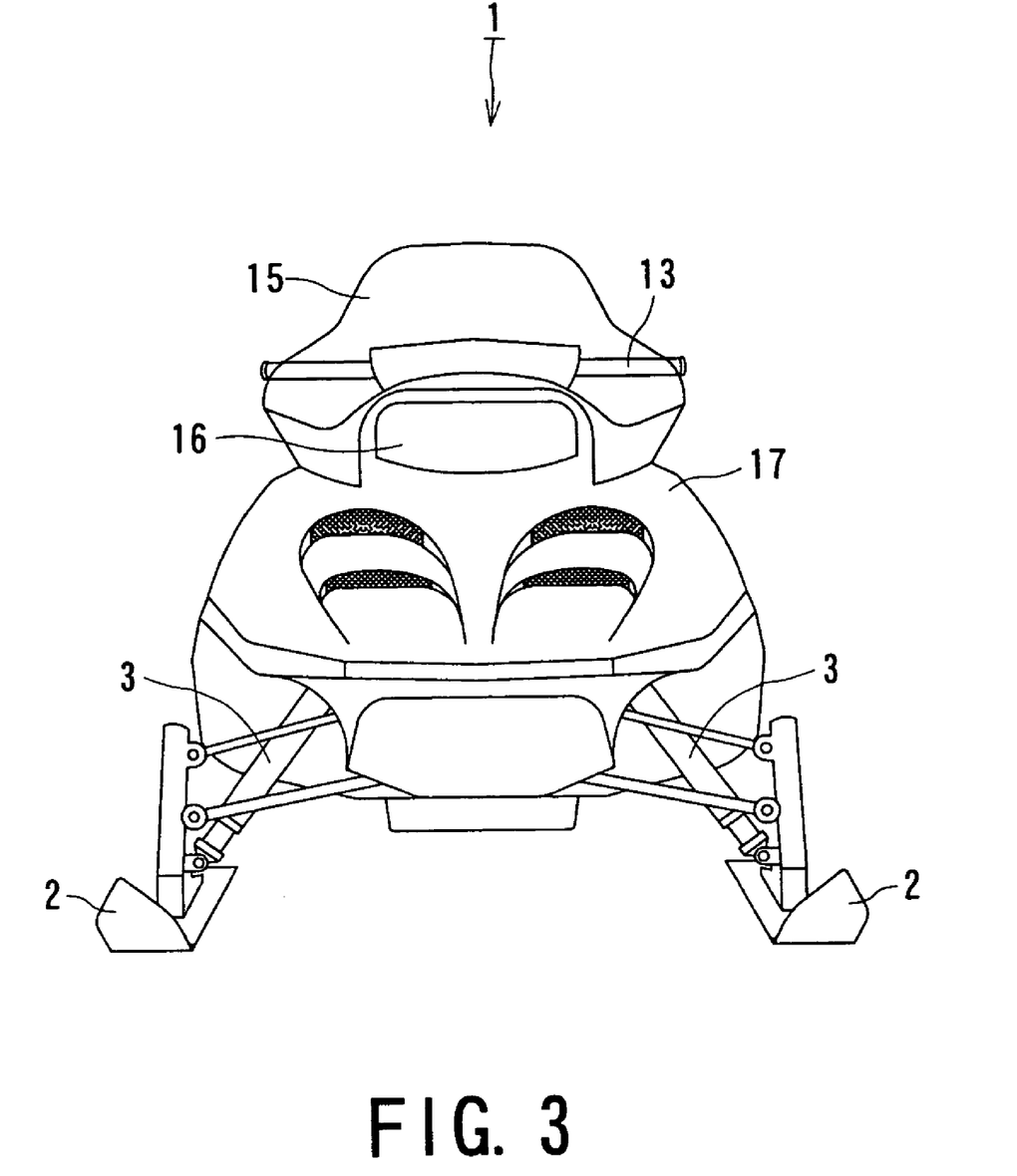
FIG. 3 is a front view of the snowmobile shown in FIG. 1.

First, with reference to FIGS. 1 to 3, a snowmobile 1 is provided, on the front lower side of a snowmobile body extending in the longitudinal direction thereof, with a pair of steering skids 2 which are controllably turned rightward or leftward to steer the snowmobile 1. The steering skids 2 are supported, in a shock-absorbing manner, to the vehicle, i.e., snowmobile, body by means of a front suspension mechanism 3. The snowmobile body is provided, on the lower and rear side thereof, with a crawler mechanism 4. The crawler mechanism 4 includes, for example, a driving wheel 5 placed on the front side, a driven wheel 6 placed on the rear side, a plurality of intermediate wheels 7 placed between these wheels 5 and 6, a rear suspension mechanism 8 for elastically supporting these intermediate wheels 7, and an endless belt 9 extending over the wheels 5, 6 and 7.

A driving seat 10 is provided above the crawler mechanism 4 so as to extend in the longitudinal direction of the snowmobile body. The driving seat 10 is provided on the opposite sides thereof with steps 11, which are placed in positions lower than the seating surface of driving seat 10. In addition, a steering handle bar 13 for operating the steering skids 2 through a steering shaft 12 is placed on the front side of the driving seat 10. A meter panel 14, a windshield 15 and additional components are placed on the front side of the steering handle bar 13. A headlight 16 is provided on the front side of the windshield 15 at a lower portion thereof, which is located in front of the meter panel 14.

The front and upper portion of the body is surrounded with an engine hood 17 to be openable and closable. The engine hood 17 defines, in the inside thereof, an engine room 18 in which an engine 19 is placed. The engine hood 17 has a slant shape, which extends gradually downward from the highest point located on the lower and front side of the headlight 16 toward the front side of the body, so that the engine hood 17 does not cut off a beam along the optical axis of the headlight 16.

The embodiment will be further described hereunder with additional reference to FIGS. 4 to 8.

As shown in FIGS. 4 to 8, the engine 19 is a four-stroke-cycle parallel (juxtaposed) multi-cylinder (in the embodiment, two-cylinders) engine, which includes a crank case 20 and a cylinder head 22. The crank case 20 is composed of a pair of crank components 20a and 20b, i.e., a lower crank case 20a and an upper crank case 20b, which is placed on the upper surface of the lower crank case 20a and provided integrally with a cylinder block 21. The lower and upper crank cases 20a and 20b have mating surfaces and assembled into the crank case, with the mating surfaces being brought into contact with each other. The cylinder head 22 is placed on the upper surface of the cylinder block 21.

Figure 8:
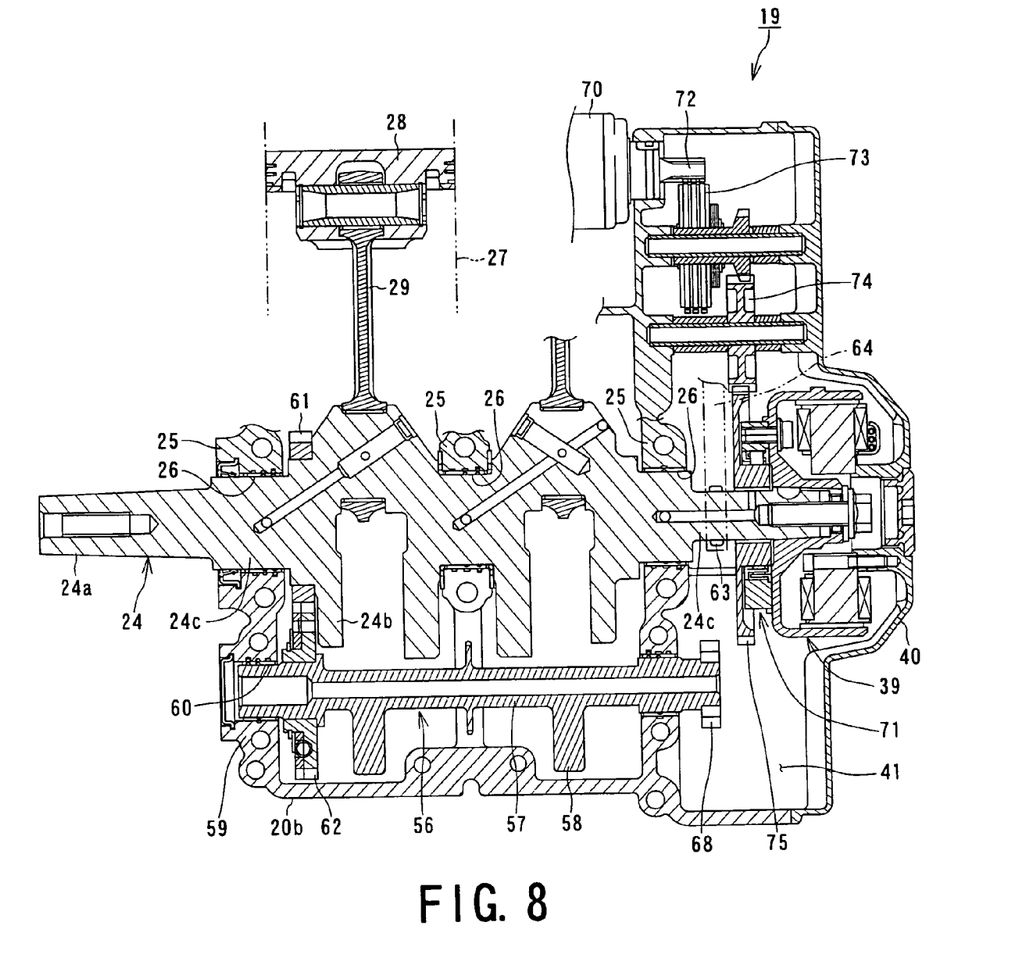
FIG. 8 is a cross sectional view taken along the line VIII—VIII in FIG. 7.

A crank shaft 24 is rotatably supported in the crank case 20 at a portion between the mating surfaces 23 of the lower crank case 20a and the upper crank case 20b. The crank shaft 24 is rotatably supported, for example, at three points thereof (i.e., the opposite side portions and the central portion) through metallic bearings 26. These bearings 26 are placed in bearing receiving portions 25, which are formed between the mating surfaces 23 of the lower crank case 20a and the upper crank case 20b.

Figure 4:
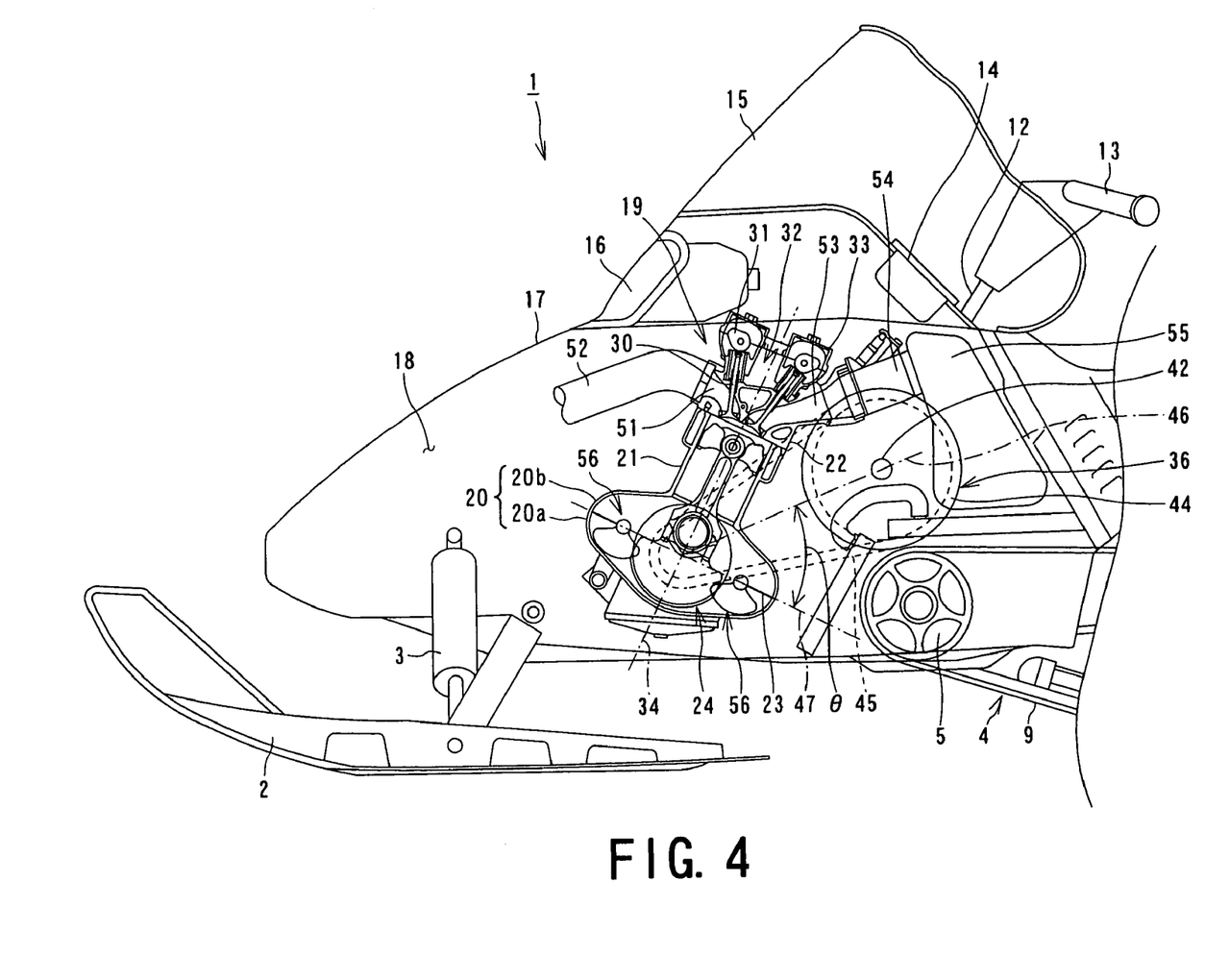
FIG. 4 is a right side view, in an enlarged scale, of an engine room for the engine of the snowmobile shown in FIG. 1.

The engine 19 is transversely mounted in the engine room 18 so that the axial line of the crank shaft 24 extends in the transverse direction of the body of the snowmobile 1. Furthermore, the engine 19 is kept in an inclined state in which it turns around the axis of the crank shaft 24 in the side view of the engine 19, so that the central axis of the cylinder 27 is inclined rearward, thus placing the cylinder head 22 below the headlight 16.

Figure 5:
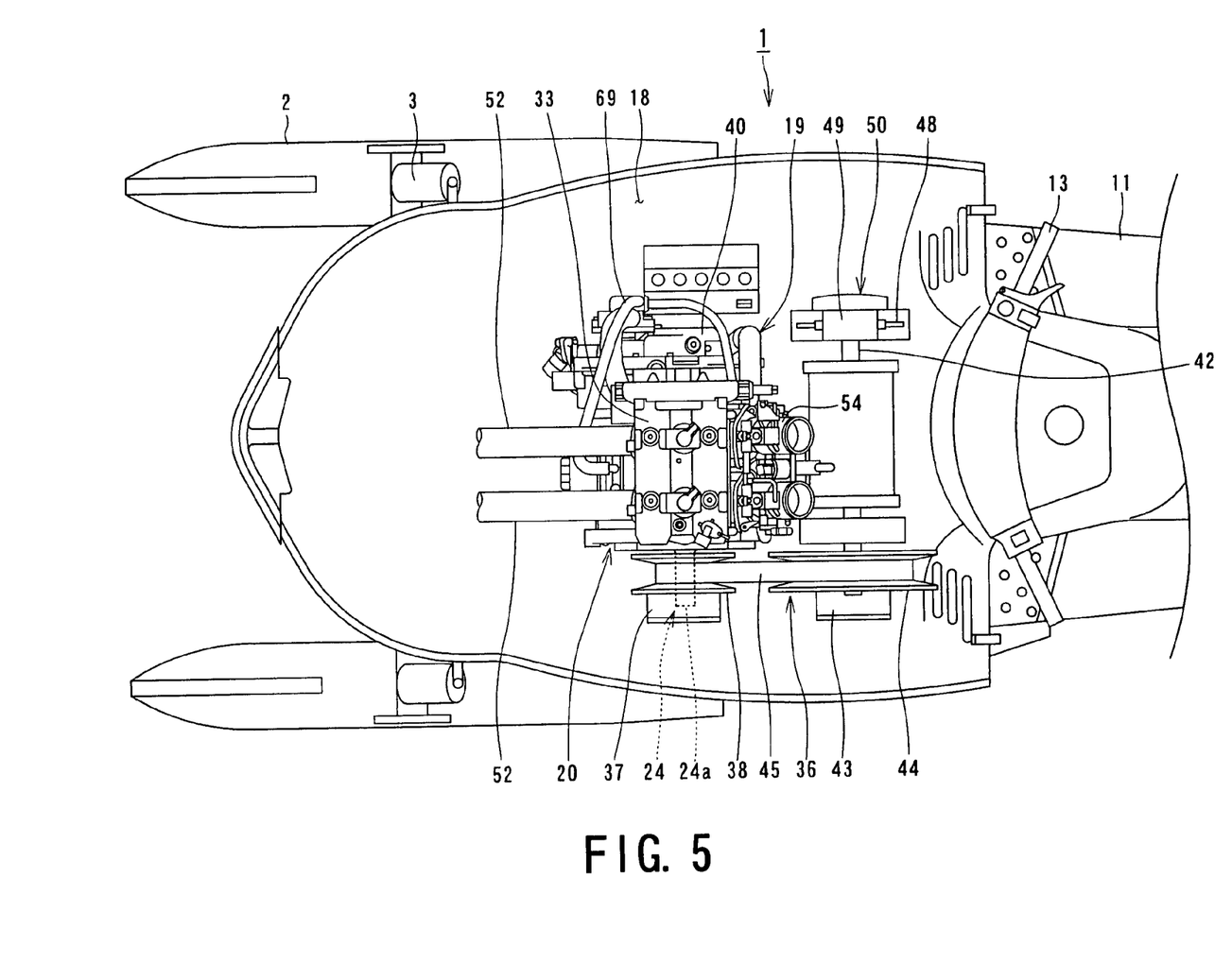
FIG. 5 is a plan view of the engine room of FIG. 4.

In addition, in the plan view of the engine 19, it is shifted slightly to one side of the vehicle body, for example, the leftward side relative to the traveling direction of the snowmobile 1 in the embodiment of the present invention.

As best shown in FIG. 8, each of the cylinders 27 formed to the cylinder block 21 has a cylinder bore, into which a piston 28 is disposed to be slidable in the perpendicular direction to the crank shaft 24. Each of the pistons 28 is connected to the crank shaft 24 by means of connection rod 29 so as to convert a reciprocating motion of the piston 28 to a rotational motion of the crank shaft 24. A valve gear unit as a valve moving mechanism 32 is arranged in the cylinder head 22, and this valve gear unit is one of engine auxiliary equipments including intake and exhaust valves 30 and a cam shaft 31 for opening and closing these valves 30 and is surrounded at the upper portion thereof with a head cover 33.

Figure 7:
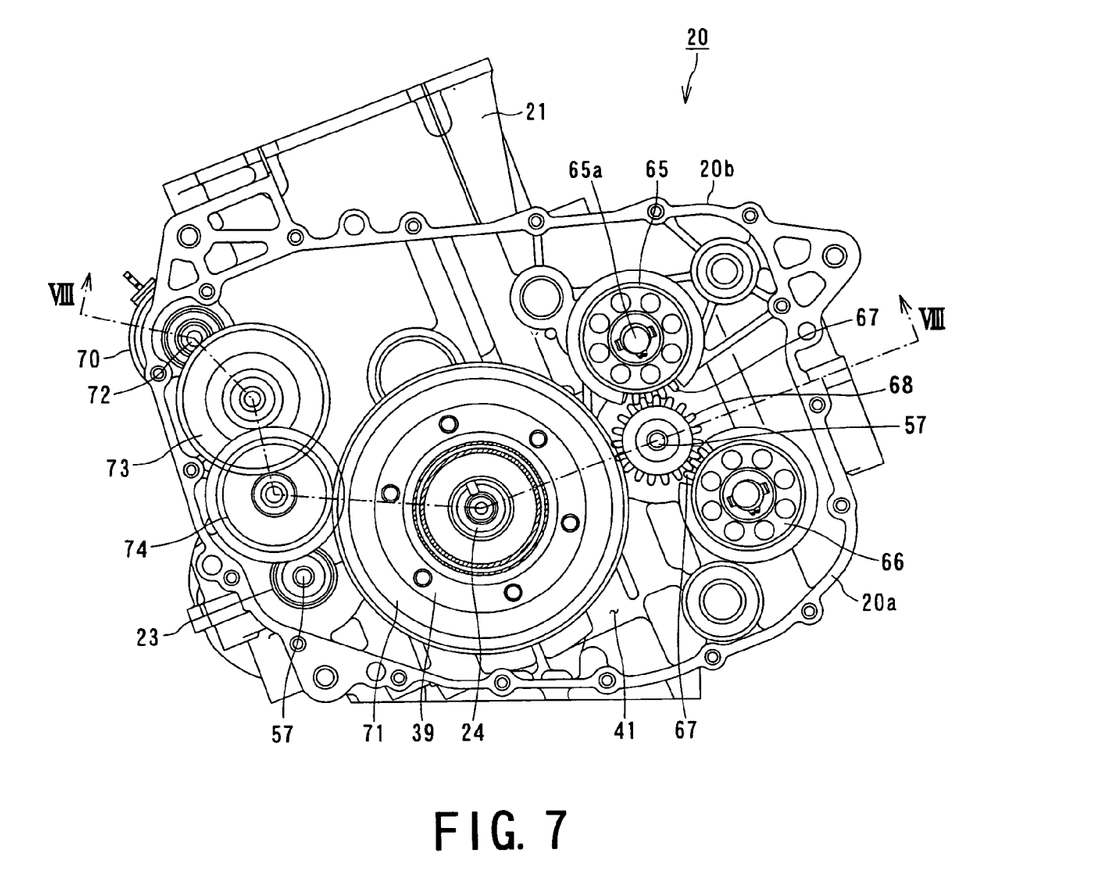
FIG. 7 is a right side view of the lower half portion of the engine shown in FIG. 6.

Referring to FIG. 7, for example, the lower crank case 20a and the upper crank case 20b are designed so that their mating surfaces 23 are perpendicular to the cylinder axial line 34. The cylinder head 22 and the cylinder block 21 of the upper crank case 20b are designed so that their mating surfaces 76 are in parallel with the mating surfaces 23 of the lower crank case 20a and the upper crank case 20b. The cylinder head 22 and the head cover 33 are designed so that their mating surfaces incline slightly downward toward the front side of the snowmobile body, when the engine 19 is placed in the arrangement such that the cylinder axial line 34 coincides with the perpendicular line, although it is not kept actually in such a state, but is kept in an inclined state as described later.

The end of the crank shaft 24, which is positioned on the shifted side of the engine 19, i.e., the left-hand end thereof of the illustrated embodiment of FIG. 8, for example, projects outside from the engine 19 so as to constitute a PTO shaft 24a. A drive pulley 38 having a drive clutch 37, which constitutes a belt driven-type continuously variable transmission mechanism (hereinafter referred to as the "CVT mechanism") 36 is connected to the PTO shaft 24a, so as to be rotatable together with the crank shaft 24, i.e., the PTO shaft 24a. The other end of the crank shaft 24, which is positioned on the side opposite to the PTO shaft 24a, i.e., the right-hand end thereof of the illustrated embodiment of FIG. 8, also projects outside from the engine 19. A magneto device 39, which is one of the engine auxiliary equipments, is connected to the other projecting end of the crank shaft 24. The crank case 20 is surrounded at its right-hand side with a magneto cover 40, which defines a magneto chamber 41 therein. The magneto device 39 is received in this magneto chamber 41. Further, in the state shown in FIG. 7, the magneto cover 40 is removed.

As best shown in FIG. 4, at a rear position of the engine 19, a drive shaft 42 is disposed on a line extending obliquely upward from the lower side of the engine 19 so as to be in parallel with the crank shaft 24. A driven pulley 44 having a driven clutch 43 is connected to the drive shaft 42 to constitute another continuously variable transmission (CVT) mechanism 36 at the end (i.e., the left-hand end) of the drive shaft 42 on the side of the drive pulley 38. A belt, for example, a clutch belt 45, is arranged so as to extend between the drive pulley 38 and the driven pulley 44 so as to transmit the rotation of the crank shaft 24 to the drive shaft 42.

The drive shaft 42 is disposed so that a tension (tensioning) direction of the clutch belt 45, i.e., a direction of a straight line 46 connecting the center of the PTO shaft 24a and the center of the drive shaft 42 is inconsistent with another straight line 47 included in the mating surfaces 23 of the crank case 20 and inclines relative to the other straight line 47 at a predetermined angle "θ", preferably within a range of from 30 degrees to 60 degrees around the center of the PTO shaft 24a.

A drive sprocket, not shown, is connected to the other end (i.e., the right-hand end) of the drive shaft 42. In addition, a drive chain, not shown, is disposed so as to extend between the drive sprocket and a driven sprocket, also not shown, which is provided concentrically with the drive wheel 5 of the crawler mechanism 4 to be rotatable together therewith for transmitting the rotational power of the engine 19 to the crawler mechanism 4. A brake disk 48 is provided on the right-hand end of the drive shaft 42 so as to be rotatable together with the drive shaft 42, thus constituting a braking device 50 which includes a brake caliper 49 and carries out a braking operation so as to be applied to the crawler mechanism 4.

An exhaust port 51 is provided for each of the cylinders on the front surface of the cylinder head 22. An exhaust pipe 52 is connected to each of the exhaust ports 51. The exhaust pipe 52 extends forward and then bends rearward, and a silencer, not shown, is connected to the downstream end of the exhaust pipe 52. On the other hand, an intake port 53 is also provided for each of the cylinders on the rear surface of the cylinder head 22. A throttle body 54 is connected to each of the intake ports 53. In addition, an air box 55 is disposed on the rear side of the throttle body 54 so as to be connected to the upstream end of the throttle body 54.

The engine 19 is provided with a balancer (balancing device) 56 for attenuating vibration of the engine 19. The balancer 56 includes a pair of balancer shafts 57 and balancer weights 58. The balancer shafts 57 are rotatably supported between the mating surfaces 23 of the lower crank case 20a and the upper crank case 20b on the front and rear sides relative to the crank shaft 24. The balancer weights 58 are provided integrally with each of the balancer shafts 57. Each of the balancer shafts 57 is rotatably supported at its opposite ends through metallic bearings 60 that are disposed in bearing supporting portions 59, which are formed between the mating surfaces 23 of the lower crank case 20a and the upper crank case 20b.

A balancer drive gear 61 is provided on a journal 24c of the crank shaft 24, which is placed between the crank web 24b for the left-hand side cylinder and a set of the bearing receiving portion 25 and the metallic bearing 26, by which the crank shaft 24 is rotatably supported at the side of the PTO shaft 24a. A balancer driven gear 62 is also provided on each of the balancer shafts 57 at their positions corresponding to the balancer drive gear 61 so as to be operatively connected thereto. The balancer drive gear 61 may be formed integrally with the crank web 24b,although the detailed description thereof is not given.

A cam-drive sprocket 63, which constitutes a driving unit for the engine auxiliary equipments, is provided on a journal 24c (i.e., in the magneto chamber 41) of the crank shaft 24. This journal 24c is disposed between a set of the bearing receiving portion 25 and the metallic bearing 26, by which the crank shaft 24 is rotatably supported at the opposite side to the PTO shaft 24a, and on the other hand, the magneto device 39 provided on the right-hand side of the crank shaft 24. A cam chain 64 is provides so as to extend between the cam-drive sprocket 63 and a cam sprocket, not shown, disposed on the cam shaft 31.

The engine 19 is also provided with a dry sump type lubricating device, which includes a lubricant tank disposed independent from the engine 19. A feed-side oil pump 65 and a scavenge-side oil pump 66, which are also the engine auxiliary equipments, are placed in the magneto chamber 41 on the right-hand side of the crank case 20. These oil pumps 65 and 66 are arranged on the upper and lower sides of the right-hand end of one of the balancer shafts 57 positioned on the front side of the crank shaft 24. In the embodiment of the present invention, the feed-side oil pump 65 is disposed above the right-hand end of the balancer shaft 57, and the scavenge-side oil pump 66 is, on the other hand, disposed below the right-hand end of the balancer shaft 57.

Both the oil pumps 65 and 66 are provided with pump-driven gears 67, respectively. In addition, a pump-drive gear 68, which is operatively connected to the pump-driven gear 67 as one of the auxiliary equipment driving systems, is provided on the right-hand end of the balancer shaft 57 on the front side of the crank shaft 24.

Figure 6:
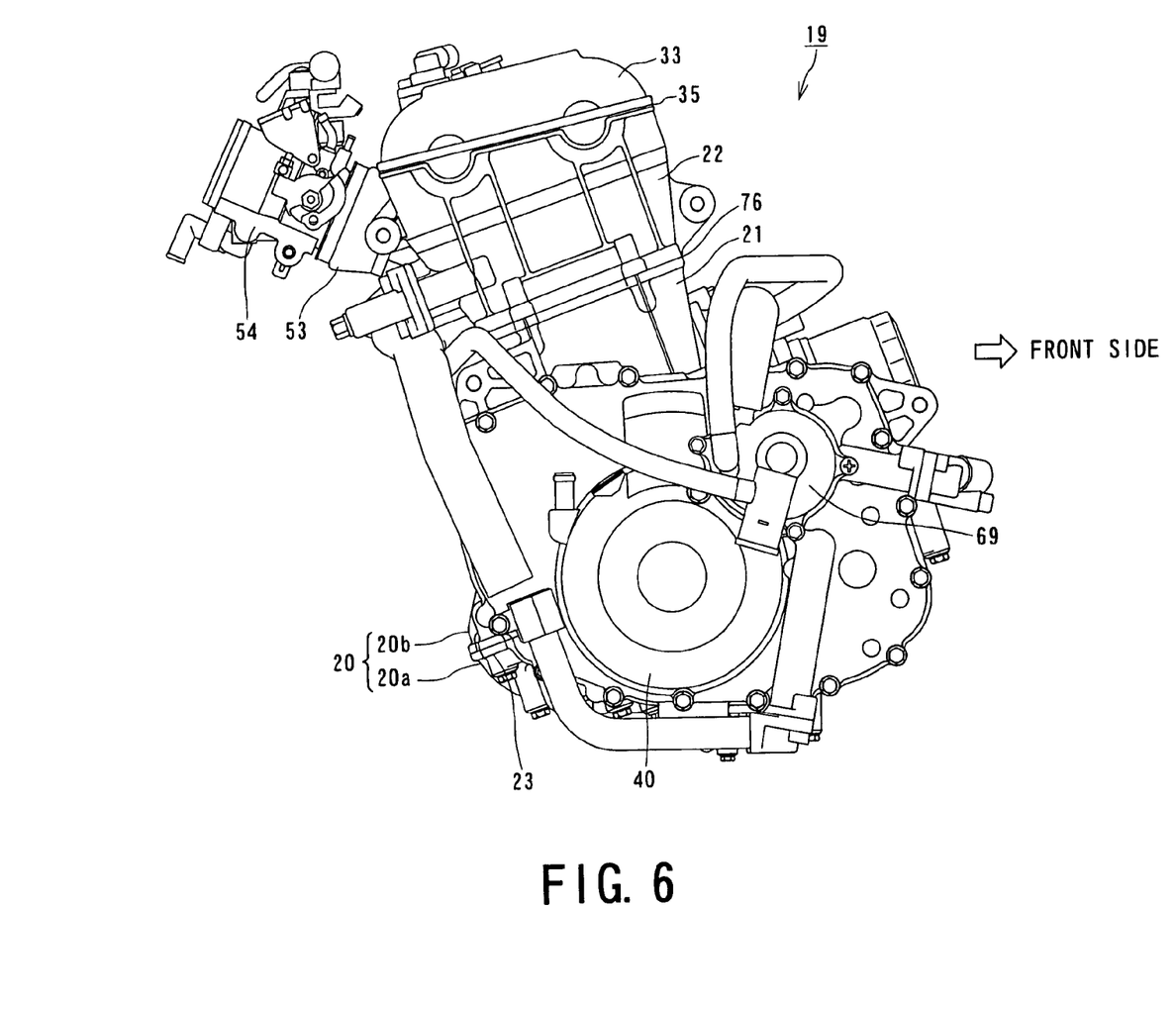
FIG. 6 is a right side view of the engine.

The engine 19 of the present invention is a water-cooled type, and a water pump 69 is mounted on the outer surface of the magneto cover 40, as shown in FIGS. 5 and 6.

The water pump 69 has a drive shaft coaxial with the pump shaft 65*a* of the feed-side oil pump 65, and these shafts are connected to each other so as to simultaneously operate both the feed-side oil pump 65 and water pump 69. Cooling water, which is supplied by means of the water pump 69, is introduced into a water jacket in the engine 19 so as to cool various portions of the engine 19.

In addition, a starter motor 70, which is also one of the engine auxiliary equipments, is disposed below the intake port 53 on the rear surface of the upper crank case 20*b*. A starter clutch, i.e., one way clutch, 71 is mounted to the journal 24*c* of the crank shaft 24, which is placed between the magneto device 39 and the cam-drive sprocket 63. Further, a drive shaft, i.e., an output shaft, 72 of the starter motor 70 is operatively connected to a clutch driven gear 75 of the starter clutch 71, which is one of the engine auxiliary equipment driving systems, through a starter limiter 73 and a starter idle gear 74. The starter limiter 73 and the starter idle gear 74 are received in the magneto chamber 41 so as to be disposed between the starter motor 70 and the balancer shaft 57 which is placed on the rear side of the crank shaft 24 in the right-hand rear portion of the crank case 20.

The engine according to the described embodiment of the present invention will attain the following functions and/or advantageous effects.

The drive shaft 42 is disposed so that the tension direction of the clutch belt 45, i.e., the direction of the straight line 46 connecting the center of the PTO shaft 24*a* and the center of the drive shaft 42 of the CVT mechanism 36 is inconsistent with the other straight line 47 included in the mating surfaces 23 of the crank case 20 and inclines and is shifted at a predetermined angle "θ", preferably within the range of from 30 degrees to 60 degrees, around the center of the PTO shaft 24*a*. Therefore, such a structure prevents the tension of the clutch belt 45 from being applied in the direction of the mating surfaces of the lower crank case 20*a* and the upper crank case 20*b*, between which the metallic bearings 26 for rotatably supporting the crank shaft 24 are mounted. That is, more specifically, load is not applied to the mating surfaces in such a direction, thus improving durability of the bearings 26 and increasing the service life thereof.

In addition, the lower crank case 20*a* and the upper crank case 20*b* are designed so that their mating surfaces 23 are positioned to be perpendicular to the cylinder axial line 34, and the engine 19 is kept in the inclined state so that the axial line of the cylinder inclines rearward by the predetermined angle "θ" according to the preferred embodiment of the present invention. It is therefore possible to easily take the angle "θ" surely without providing any specific design, to manufacture the crank case 20 in an easy manner and to improve durability of the bearing receiving portions 25 bearing the load of the crank shaft 24.

The crank shaft 24 and the balancer shafts 57 are rotatably supported between the mating surfaces 23 of the lower crank case 20*a* and the upper crank case 20*b*, with the result that a the crank shaft 24 and the balancer shafts 57 can be placed in a single step, thus reducing the assembling steps. In addition, it is possible to provide the bearing supporting portions 59 for supporting the balancer shafts 57 to be integrally with the crank case 20, thus dispersing the tension of the clutch belt 45, which is applied to the bearing receiving portions 25 of the crank shaft 24. The height of the whole engine 19 can also be reduced.

Furthermore, not only the engine auxiliary equipments that include the magneto device 39, the cam drive sprocket 63 for driving the cam shaft 31, the pump drive gear 68 for driving the oil pump, and the clutch driven gear 75 for the starter clutch 71, to which the driving force of the starter motor 70 is to be transmitted, but also the drive units for driving such engine auxiliary equipments are disposed on the side opposite to the arrangement of the CVT mechanism 36 in the crank case 20. According to such layout, there is no existence of the drive units for the auxiliary equipments on the crank shaft 24 on the side of the CVT mechanism 36. This makes it possible to decrease the length of the end portion of the crank shaft 24, which is arranged on the side of the CVT mechanism 36, i.e., the PTO shaft 24*a*, to reduce the bending moment caused by the tension of the belt, to be applied to the bearing receiving portion 25 formed on the side of the PTO shaft 24*a* of the crank shaft 24. Accordingly, there is no need to increase the diameter of the crank shaft 24 including the PTO shaft 24*a*, thus making it possible to miniaturize the bearing and provide the engine 19 having a small-size and a reduced weight.

Still furthermore, the balancer drive gear 61 for driving the balancer shafts 57 of the balancer 56 is provided on the journal 24*c* of the crank shaft 24 placed in the inside the bearing receiving portion 25, by which the crank shaft 24 is rotatably supported at the side of the PTO shaft 24*a*, and in addition, the cam drive sprocket 63, the pump drive gear 68 and the clutch driven gear 75 are disposed on the outer side relative to the bearing receiving portion 25. According to such arrangement or structure, the distances between the center of the engine 19 and the bearing receiving portions 25 on the opposite sides of the crank case 20 can be made equal to each other, thus providing a properly balanced load.

It is further to be noted that the present invention is not limited to the embodiment described above, and many other changes and modifications may be made without departing from the scopes of the appended claims.

What is claimed is:

1. A four-stroke-cycle engine comprising:
a crank case, which is dividable into a plurality of crank case components having mating surfaces, said crank case components being assembled into the crank case by contacting the mating surfaces to each other;
a crank shaft rotatably supported in the crank case at a portion between the mating surfaces of the crank case components; and
a belt driven-type continuously variable transmission mechanism operatively connected to one end of the crank shaft through a clutch belt, said continuously variable transmission mechanism including a drive shaft, said clutch belt being stretched around the drive shaft and the crank shaft so that a tension direction of the clutch belt has an inclination by a predetermined angle with respect to a line passing the mating surfaces of the crank case components.

2. A four-stroke-cycle engine according to claim 1, wherein said mating surfaces of the crank case components are perpendicular to an axial line of a cylinder of the engine so that the engine is disposed in an inclined state in which the axial line of the cylinder inclines relative to a perpendicular line.

3. A four-stroke-cycle engine according to claim 1, further comprising a balancer having a balancer shaft rotatably supported in the crank case so as to be held between said mating surfaces of the crank case components.

4. A four-stroke-cycle engine according to claim 1, further comprising: auxiliary equipments including a magneto device, a cam drive sprocket for driving a cam shaft, a pump drive gear for driving an oil pump and a clutch driven gear for a starter clutch to which a driving force of a starter motor is transmitted; and drive units for driving said auxiliary equipments, said auxiliary equipments and said drive units being arranged on a side opposite to the side on which the continuously variable transmission mechanism is disposed.

5. A four-stroke-cycle engine according to claim 4, wherein said balancer shaft is driven by a balancer drive gear disposed on an inner side of a bearing portion by which one end of the crank shaft, that is located on the side of the continuously variable transmission mechanism is supported, said drive units for driving the auxiliary equipments being placed on an outer side of another bearing portion by which another end of the crank shaft, that is located on the side opposite to the side on which the continuously variable transmission mechanism is supported.

6. A four-stroke cycle engine according to claim 1, wherein said engine is a water-cooling engine for a snow-mobile provided with an engine room in which the engine is transversely mounted.

7. A four-stroke-cycle engine according to claim 6, wherein said crank case is composed of upper and lower crank case components which are joined together at the mating surfaces thereof.

8. A four-stroke-cycle engine according to claim 1, wherein said predetermined angle is within a range of 30 to 60 degrees.

* * * * *